United States Patent
Gu et al.

(10) Patent No.: US 11,968,064 B2
(45) Date of Patent: Apr. 23, 2024

(54) MULTIPLE-INPUT AND MULTIPLE-OUTPUT (MIMO) DETECTION IN WIRELESS COMMUNICATIONS

(71) Applicant: ZEKU TECHNOLOGY (SHANGHAI) CORP., LTD., Shanghai (CN)

(72) Inventors: Jian Gu, San Diego, CA (US); Chengzhi Li, San Diego, CA (US); Hang Zhou, San Diego, CA (US); Bin Liu, San Diego, CA (US)

(73) Assignee: ZEKU TECHNOLOGY (SHANGHAI) CORP., LTD., Shanghai (CN)

( * ) Notice: Subject to any disclaimer, the term of this patent is extended or adjusted under 35 U.S.C. 154(b) by 0 days.

(21) Appl. No.: 17/953,088

(22) Filed: Sep. 26, 2022

(65) Prior Publication Data
US 2023/0040774 A1 Feb. 9, 2023

Related U.S. Application Data

(63) Continuation of application No. PCT/US2021/019081, filed on Feb. 22, 2021.
(Continued)

(51) Int. Cl.
*H04L 25/03* (2006.01)
*H04B 7/022* (2017.01)
(Continued)

(52) U.S. Cl.
CPC ....... *H04L 25/03242* (2013.01); *H04B 7/022* (2013.01); *H04B 7/0417* (2013.01);
(Continued)

(58) Field of Classification Search
CPC ............ H04L 25/03242; H04L 1/0054; H04L 2025/03426; H04B 7/022; H04B 7/0417; H04B 7/0626
See application file for complete search history.

(56) References Cited

U.S. PATENT DOCUMENTS

2005/0113107 A1* 5/2005 Meunier ............... H04W 4/023
455/422.1
2008/0239936 A1* 10/2008 Doberstein ........... H04L 1/0055
370/201
(Continued)

OTHER PUBLICATIONS

Guo et al., Algorithm and Implementation of the K-Best Sphere Decoding for MIMO Detection, IEEE Journal on Selected Areas in Communications, vol. 24, No. 3, Mar. 2006, 13 pp.
(Continued)

*Primary Examiner* — Jaison Joseph
(74) *Attorney, Agent, or Firm* — PERKINS COIE LLP

(57) ABSTRACT

Introduced here is at least one technique to better estimate interference at a receiver. The technique includes receiving a plurality of reference signals, which each have information indicative of noise. Thus, the technique further includes, for each reference signal, determining a noise estimation and determining a distance metric and log-likelihood ratio (LLR) of the noise estimation. Once the distance metric and LLR of each reference signal is determined, the receiver can determine a final LLR based on the distance metric and LLR of each reference signal. In this manner, a final LLR is determined. This technique can be applied by any device operating on MIMO technology.

18 Claims, 5 Drawing Sheets

Related U.S. Application Data

(60) Provisional application No. 63/031,364, filed on May 28, 2020.

(51) Int. Cl.
  *H04B 7/0417* (2017.01)
  *H04B 7/06* (2006.01)
  *H04L 1/00* (2006.01)

(52) U.S. Cl.
  CPC ......... *H04B 7/0626* (2013.01); *H04L 1/0054* (2013.01); *H04L 2025/03426* (2013.01)

(56) References Cited

U.S. PATENT DOCUMENTS

| | | | | |
|---|---|---|---|---|
| 2009/0232241 | A1* | 9/2009 | Shabany | H04L 25/067 375/267 |
| 2010/0158150 | A1* | 6/2010 | Prasad | H04L 25/03318 375/262 |
| 2011/0129040 | A1* | 6/2011 | Veronesi | H04L 25/067 375/334 |
| 2012/0082197 | A1* | 4/2012 | Jonsson | H04B 1/712 375/224 |
| 2012/0082274 | A1* | 4/2012 | Bury | H04L 25/0202 375/346 |
| 2013/0272462 | A1* | 10/2013 | Siti | H04L 25/03292 375/341 |
| 2015/0098514 | A1* | 4/2015 | Tamma | H04L 27/2071 375/330 |
| 2015/0110205 | A1* | 4/2015 | Jin | H04L 1/0057 375/257 |
| 2017/0294986 | A1* | 10/2017 | Khsiba | H04L 1/0054 |
| 2019/0044759 | A1* | 2/2019 | Hedstrom | H04L 25/03891 |

OTHER PUBLICATIONS

Barbero et al., Rapid Prototyping of a Fixed-Throughput Sphere Decoder for MIMO Systems, IEEE ICC 2006, p. 3082-3087.

Barbero et al., Fixing the Complexity of the Sphere Decoder for MIMO Detection, IEEE transactions on wireless communications, Jun. 2008, vol. 7, No. 6, 12 pages.

Georgis et al., Geosphere: an Exact Depth-First Sphere Decoder Architecture Scalable to Very Dense Constellations, EEE Access, DOI 10.1109/ACCESS.2017.2684706, 15 pages.

International Search Report dated May 20, 2021 in Application No. PCT/US2021/019071.

Written Opinion dated May 20, 2021 in Application No. PCT/US2021/019081.

International Search Report dated May 20, 2021 in Application No. PCT/US2021/019081.

* cited by examiner

MULTIPLE-INPUT AND MULTIPLE-OUTPUT (MIMO) DETECTION IN WIRELESS COMMUNICATIONS

CROSS-REFERENCE TO RELATED APPLICATION(S)

This application is a continuation of International Application No. PCT/US2021/019081 filed Feb. 22, 2021, which claims priority to U.S. Provisional Application No. 63/031,364, titles "METHOD AND APPARATUS FOR MIMO DETECTION IN WIRELESS COMMUNICATION SYSTEM" and filed on May 28, 2020, the content of which is incorporated herein by its entirety.

TECHNICAL FIELD

The disclosed techniques relate to wireless communications, and more particularly, for multiple-input and multiple output (MIMO) detection in wireless communications.

BACKGROUND

Wireless communications have become ubiquitous in the recent decades. Nearly every person has a wireless device (e.g., cell phone) on their person at all times. To serve these wireless devices, network providers are building base stations or upgrading existing base stations to keep up with the growing demands. For instance, with the push for 5th generation (5G) to become universal, network providers are vigorously upgrading their network systems.

The interactions between the wireless devices and the base stations are also continuously being updated. This is because more user traffic is being transmitted between the wireless device and base stations, and thus, optimal usage of the bandwidth is a primary concern. However, interference from various sources hinder optimal usage because both the wireless device and the base station need to be able to approximate the interference.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

References in this description to "an embodiment," "one embodiment," or the like, mean that the particular feature, function, structure, or characteristic being described is included in at least one embodiment of the present disclosure. Occurrences of such phrases in this specification do not necessarily all refer to the same embodiment. On the other hand, the embodiments referred to also are not necessarily mutually exclusive.

As alluded to above, wireless communications have become a necessity in recent decades. So much so that the traffic on wireless networks is constantly burdening the wireless system infrastructure. Due to this, wireless network providers are constantly working to optimize their network infrastructure. For instance, large scale improvements like upgrading to 5th generation (5G) technology will likely have a large impact on the optimization metrics of a network. Further, network providers continue to deploy new base stations or upgrade existing base stations to expand and better their network coverage. Such software and hardware based upgrades are likely to improve the network performance.

However, certain issues persist irrespective of the large scale updates that periodically occur. Namely, networks experience multiple type of interferences that impact communications between a base station and a wireless device. The interferences, in turn, causes other issues. First, a network device can generally experience two types of interference: thermal and environmental. Thermal interference (or thermal noise) is commonly present in many electrical circuits and is generated by thermal agitation of electron inside an electrical component. In other words, the thermal noise is constantly present because at least one electrical component is functioning while the device is on. Thus, while thermal noise does cause interference, it is a stable interference that is unavoidable and can, in some circumstances, be predictable. As such, accommodating for thermal noise is not a difficult task because a stable interference can be assumed throughout the communication (e.g., a signal).

Environment interference, conversely, is dynamic. The dynamic nature is partially caused by multiple sources of environmental interference. For instance, environmental interference can be caused by known signal interference concepts such as diffraction. For example, when signals are impacted by obstructions in the signal path. In addition, a wireless device can receive interference from multiple base stations in the vicinity of the wireless device.

Figure 1B:
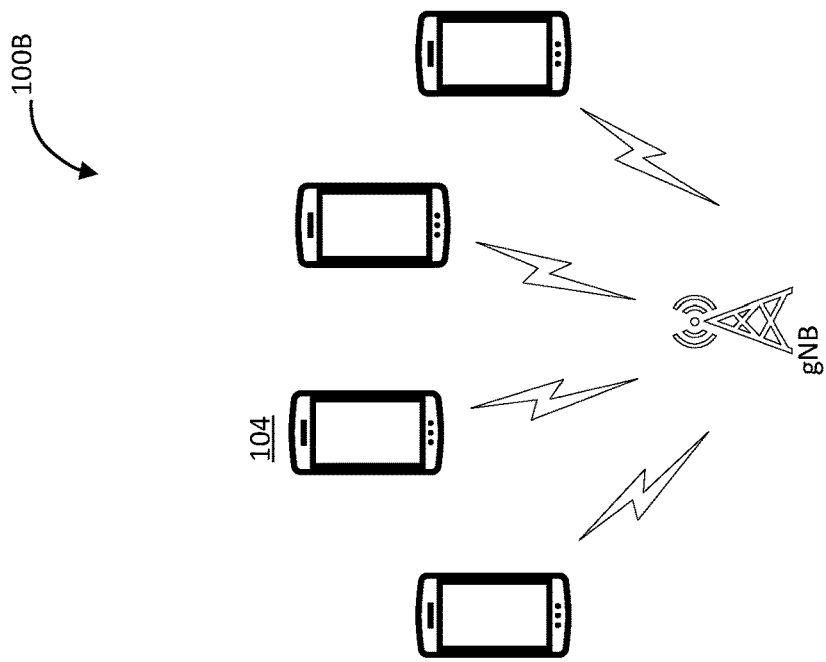
FIG. 1B depicts an example of a scenario where interference is caused when one base station is communicating with multiple wireless devices.
Figure 1A:
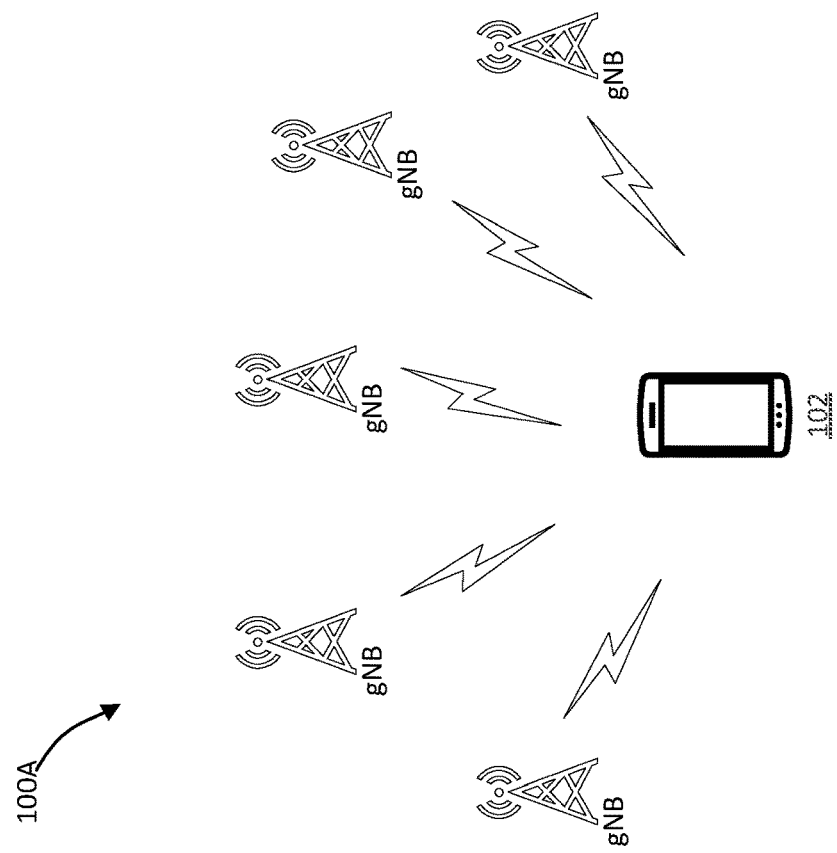
FIG. 1A depicts an example of a scenario where interference from multiple base stations impacts a wireless device.

FIG. 1A depicts an example of a scenario 100A where interference from multiple base stations impacts a wireless device. In scenario 100A, wireless device 102 can receive signals from the gNode Bs (gNBs) surrounding the wireless device 102. However, mobile device 102 can be connected to only one of the depicted gNBs. As such, the signals from the other gNBs are merely interference. Nevertheless, the wireless device 102 must differentiate the interference from necessary traffic. Moreover, the gNBs surrounding the wireless device 102 can be communicating to not just the wireless device 102, but other devices as well. Thus, there may multiple signals that can interfere with the wireless device 102.

FIG. 1B depicts another scenario 100B where interference is caused when one base station is communicating with multiple wireless devices. In FIG. 1B, the wireless device 104 is experiencing interference due to one gNB communicating with multiple wireless devices. As such, wireless device 104, due to its proximity to other wireless devices and the gNB, can receive the signals that are meant for the other wireless devices. Again, in this situation, the mobile device 104 needs to be able to differentiate between necessary and unnecessary signals.

In order for the wireless devices 102 and 104 to determine the level of interference on any given signal, there are commonly used methods. For instance, the base stations (e.g., gNB) can send reference signals. The reference signals can include information that can allow the terminal device to estimate the level of interference in communications between the base station and the wireless device. The wireless device can use the noise estimate to better detect interference. However, while the noise estimate is helpful, it still does not address the issue completely and causes others.

In particular, a reference signal is considered overhead because no traffic (e.g., user data) is transmitted on the reference signal. As mentioned before, with increasing demands for optimal usage, especially of limited bandwidth, sending multiple reference signals is wasteful. Further, because the bandwidth is limited, reference signals are sent periodically with estimates of interference. However, since interference is dynamic, the estimates are not accurate. For example, a user of a wireless device may move locations, nearer to other devices, or any other change that may cause interference. The change may occur in between the sending on a reference signal. Thus, the reference signals are not always accurate.

For example, in scenario 100B in FIG. 1B, the wireless device 104 may receive a reference signal indicating a particular noise estimate. Before sending another reference signal, the gNB may send multiple signals to the wireless device neighboring wireless device 104. Thus, the noise estimate will have changed. However, because the reference signal was sent prior to the increase in communication, the wireless device 104 is unaware of the increase in interference, and thus, may not correctly detect interference. Similarly, when the interference changes due to environmental circumstances (e.g., buildings) between the transmission of reference signals, the wireless device is unaware of the increase and/or decrease in interference.

To address the issues depicted in scenarios 100A-B and others, the common technique is to use multiple noise estimators. The output from the multiple noise estimators (e.g., a covariance matrix) is then input to a noise covariance selector. The selector choses one covariance matrix as the estimate of noise of the received signal and proceeds with the remaining processes. However, selecting one covariance matrix, in practice, means that only one noise estimation is used to process the received signal. Due to this approach, the noise estimate can have a large probability of error. For example, when one noise estimate from 10 noise estimates is selected, the data from the other 9 noise estimates is wasted; thereby, reducing the accuracy of the noise estimate and degrading demodulation performance.

Introduced here, therefore, is at least one technique to use multiple estimates of interference to demodulate signals at a wireless device. More specifically, one or more embodiments of the disclosed techniques can include analyzing each noise estimation to determine a distance metric and log-likelihood-ratio (LLR). And, based on the distance metric, combining or selecting the LLR based on noise estimates to determine a final demodulation output. The noise estimate can be, in some cases, indicative of noise estimates from a variety of base stations, or from one base station. The distance metric can be, for example, a Euclidean distance or Manhattan Distance. In some embodiments, the wireless device can analyze the distance metric to determine the LLR from either which noise estimates to combine or which particular noise estimate to select amongst the multiple noise estimates. In other words, the wireless device, based on the distance metric, can better determine the LLR according to the noise estimate based on one or more noise estimates received from one or more base stations.

In order to improve performance of a demodulating MIMO signal, multiple noise estimates need be fully utilized. MIMO detection includes Cholesky decomposition, sphere decoding, and QR decomposition techniques. Additionally, a common channel estimation can be applied to all the receive noise estimations. Based on these techniques and others, as further described below, the wireless device can determine the distance metric and LLR.

In the following description, the example of a wireless device is used, for illustrative purposes only, to explain various aspects of the techniques. Note, however, that the techniques introduced here are not limited in applicability to wireless devices or to any other particular kind of devices. For example, other electronic devices, systems, equipment (e.g., a laptop or a tablet) may adapt the techniques in a similar manner. Further, wireless device is used to describe devices such as cell phones (e.g., iPhones) and/or the equipment included within or used to implement a cell phone. However, other terms such as terminal, terminal device, mobile device, and others may also be used in reference to similar devices.

Note that while the techniques introduced here are described in the context of a 4G or 5G network, these techniques are not necessarily limited to applicability to 4G or 5G networks, nor even to wireless telecommunications. Hence, the techniques introduced here are potentially application in technology areas beyond those described herein.

Further, reference signal is used to describe a signal that is used to estimate a noise. However, other terms such as pilot signal, pilot symbols, and other may also be used in reference to similar signals.

Also, note that while the techniques introduced here are described, in some embodiments, from the perspective of a terminal device (e.g., a cell phone) or a base station, these techniques are not necessarily limited to applicability only to a terminal device or a base station. Rather, the techniques introduced here can be applied at either or both a terminal device and/or a base station. Further, the techniques introduced here can be applied by equipment included within or used to implement a terminal device and/or a base station.

Noise Estimation System

Figure 2:
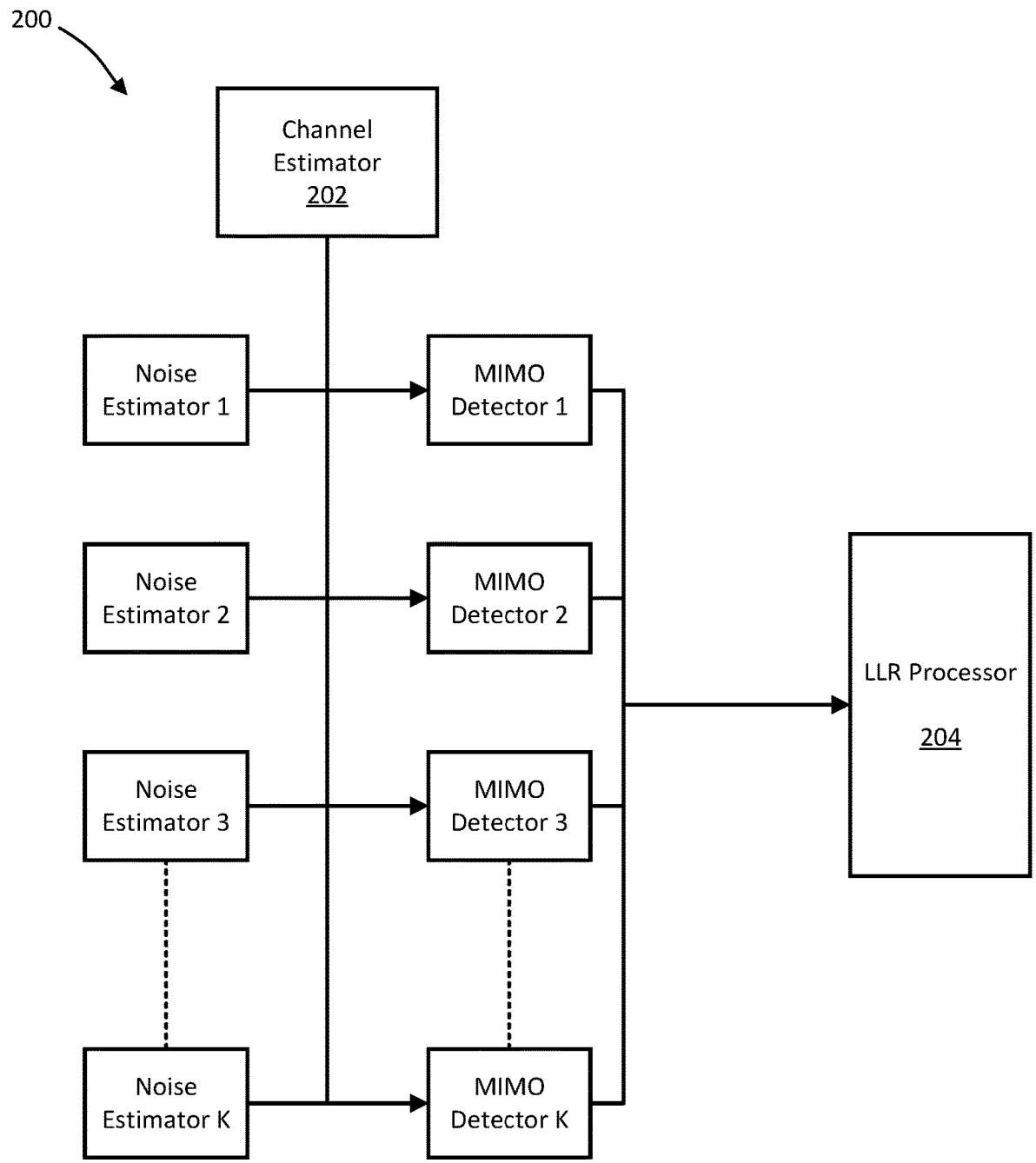
FIG. 2 depicts a high-level block diagram of a noise estimation system.

FIG. 2 depicts a high-level block diagram of a noise estimation system 200. Noise estimation system 200 includes channel estimator 202, LLR processor 204, noise estimators (e.g., noise estimator 1, 2, 3) and multiple-in-multiple-out (MIMO) detectors (e.g., MIMO 1, 2, 3). Channel estimator 202, generally, determines the channel properties of a signal. The properties describe how a signal propagates from the transmitter to the receiver and represents the combined effect of, for example, scattering, fading, and power decay. For example, the channel estimator 202 can provide information regarding the fading characteristics of a signal to the MIMO detector 1.

The noise estimators (e.g., noise estimator 1, 2, 3) estimate the noise based on a reference signal. In some embodiments, estimating the noise may include subtraction of an expected reference signal from the received reference signal. In some embodiments, the noise estimators may apply various algorithms to a received signal (e.g., the reference signal) to estimate the noise. For instance, the noise estimators may apply Fourier Transform principles to estimate the noise.

Further, each noise estimator can apply a unique estimation algorithm or the same algorithm as another noise estimator. For instance, noise estimator 1 can apply an algorithm based on time domain principles, while noise estimators 2 and 3 can apply frequency domain-based algorithms. In another example, all the noise estimators can apply frequency domain-based algorithms. Moreover, the noise estimators can apply parametric filtering based on, for example, time, direction, and/or frequency. For instance, the noise estimators can use different or the same parameters to estimate the noise. For example, noise estimator 1 can estimate the noise based on a frequency of the signal, while noise estimators 2 and 3 can estimate the noise based on the time from a threshold value. In this manner, the noise estimators can estimate the noise using the same or different algorithms based on the same or different parameters.

In some embodiments, the noise estimators can estimate the noise for each resource of the signal. In 4G and 5G, the resource is a resource block. In other technologies such as 802.11, the resource can be a resource unit. The noise estimators can, then, output a noise covariance matrix for each resource. For instance, in a downlink scenario, the noise estimators in the terminal device can output covariance matrices that are indicative of the noise from the base stations other than the one that the terminal device is connected to. In an uplink scenario, for example, the noise estimators in the base station can output covariance matrices that are indicative of the noise from the terminals other than the ones that the base station is connected to.

For example, a terminal device may be located in a park with ten gNBs in the vicinity. The terminal device may connect with a particular gNB based on, for example, distance from the gNB or the signal to noise ratio (SNR). As such, the terminal is not connected to the other nine gNBs. However, as described in FIGS. 1A-B, the terminal device continues to be affected by the interference caused by the other nine gNBs and any communication that the connected—to gNB is having with other terminal devices nearby. As such, the terminal device may receive multiple reference signals from the connected—to gNB. For example, the gNB may send a reference signal corresponding to each resource block that is transmitted. Each of the reference signals can be parsed through a single noise estimator (e.g., noise estimator 1, 2, 3). After which, each covariance matrix can be passed to the corresponding MIMO detector.

The MIMO detectors, in general, are programmed to determine the distance metric and LLR value based on each covariance matrix from the noise estimators. Once both are determined, the MIMO detectors output the values to the LLR processor 204. The LLR processor 204 combines the LLR to determine a final LLR. The final LLR uses information from each of the noise estimates, when appropriate. For example, the LLR processor 204 can chose one noise estimate or combine multiple noise estimates based on, for example, the distance metric. This process for determining the distance metric and LLR are further explained below. The MIMO detector algorithm includes but not limited to linear algorithm (e.g., IRC (interference rejection combining), MMSE (minimum mean square error), ZF (zero forcing), MMSE SIC (serial interference cancellation), ZF SIC, etc) and ML based on algorithm (e.g., sphere decoding), and others.

Figure 3:
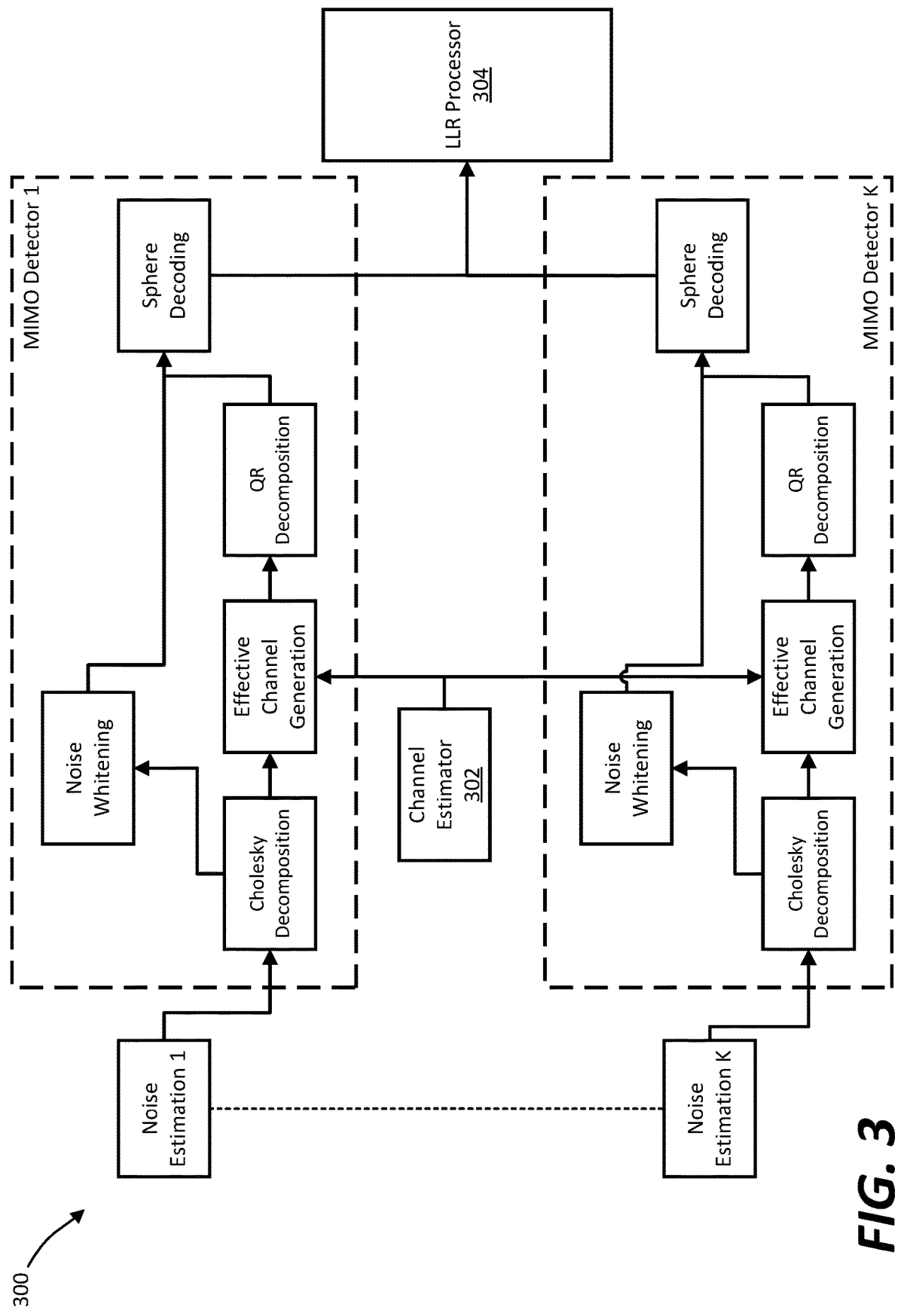
FIG. 3 depicts a high-level block diagram of the multiple-in-multiple-out (MIMO) systems used in the noise estimation systems.

FIG. 3 depicts a high-level block diagram 300 of the multiple-in-multiple-out (MIMO) systems used in the noise estimation systems. Diagram 300 includes multiple noise estimators (e.g., noise estimator 1 to noise estimator k), and multiple corresponding MIMO detectors. The MIMO detectors receive input from the channel estimator 302 and provide outputs to LLR processors 304. Each MIMO detector includes several components. Although the components are depicted as individual blocks, functionally, they may be processes, algorithms, or the like that are applied at a common processor within a device. In other words, the blocks are depicted for ease of description, rather than as a depiction of the function layout of each MIMO detector.

Each noise estimator performs the tasks described in conjunction with FIG. 1. The output of each noise estimator, a covariance matrix, is input to the corresponding Cholesky decomposition block. Here, the covariance matrix is transformed based on Cholesky decomposition techniques. The output of Cholesky decomposition is sent to both the noise whitening module and the effective channel generation module.

The noise whitening module, for example, equalizes the spectrum of the signal, making it similar to the white noise spectrum. The effective channel generation module processes the Cholesky decomposition output and the channel estimator output to determine the effective channel of the receive reference signal and/or the particular resource. After which the QR decomposition techniques decompose the matrix into a product of two matrices such as the orthogonal matrix and the upper triangular matrix. The sphere decoder then applies sphere decoding technique to output the LLR and distance metric. For example, the sphere decoder can apply algorithms such as k-best, fixed complexity sphere decoding, and/or depth first sphere decoding.

For example, noise estimator 1 can receive a reference signal denoted as y for a resource block. Noise estimator 1 can output a covariance matrix, for the i th resource. Thus, the multiple noise estimators can provide a matrix denoted by $N_{i,k}$ k=1, . . . , K for the i th resource. The covariance matrix can be input into the MIMO detector k (e.g., MIMO detector 1), and more specifically, into the Cholesky decomposition module in MIMO detector k. The Cholesky decomposition output, $L_{i,k}$ in MIMO detector 1, can be denoted as $N_{i,k} = L_{i,k} L_{i,k}^H$, where $L_{i,k}$ is a lower triangle matrix.

Next, the noise whitening module can output matrix denoted as, $\tilde{y}_{i,j,k}$, and related to the Cholesky decomposition out and lower triangle matrix as $\tilde{y}_{i,j,k} = L_{i,k}^{-1} y_{i,j}$, where $y_{i,j}$ is the j th received modulation symbol of the i th resource. Effective channel from effective channel generation is given by $\tilde{H}_{i,j,k} = L_{i,k}^{-1} H_{i,j,k}$, where $\tilde{H}_{i,j,k}$ is the effective channel estimation of the jth received modulation symbol of the i th resource for MIMO detector 1. $\tilde{H}_{i,j,k}$ can also be described as the precoding matrix multiplied with the channel estimation. In some cases, $\tilde{H}_{i,j,k}$ may have different dimensions. For instance, based on the capabilities of the MIMO detector, the $\tilde{H}_{i,j,k}$ matrix can vary the dimensions.

The output from the effective channel generation module is sent to the QR decomposition module. QR decomposition module outputs $Q_{i,j,k}$ and $R_{i,j,k}$, where $Q_{i,j,k}$ is an orthogonal matrix and $R_{i,j,k}$ is an upper triangular matrix given by $R_{i,j,k} = Q_{i,j,k} \tilde{H}_{i,j,k}$. These outputs are input to the sphere decoding module. The sphere decoding module, applies one of various sphere decoding algorithms to output the LLR and distance metric.

The LLR and distance metric can be denoted as $v_{i,j,k}$ and $m_{i,j,k}$, respectively, where $v_{i,j,k}$ is a M-by-1 vector, M is modulation order multiplied by number of MIMO detectors being used. In some embodiments, the final LLR output for modulation symbol j in resource i is given by:

$$\sum_{k=1}^{K} v_{i,j,k}$$

In some embodiments, the LLR output for modulation symbol j in resource i can be denoted by $v_{i,j,kk}$, where kk is selected according to the distance metric $m_{i,j,k}$, k=1, ..., K. The distance metric can be based on, for example, the Euclidean or Manhattan distance between $\tilde{y}_{i,j,k}$ and the output of the sphere decoding module. In the case where the distance metric is, for example, the Euclidean or Manhattan distance between $\tilde{y}_{i,j,k}$ and survival path of sphere decoding, denoted as:

$$kk = \underset{k=1,\ldots,K}{\operatorname{argmin}}(m_{i,j,k} + \Delta_k),$$

where $\Delta_k$ is an adjustment parameter for sphere decoding module in MIMO detector k. $\Delta_k$ can depend on parameters of sphere decoding module k such as the algorithm type, complexity of sphere decoding k, or dimension of $H_{i,j,k}$. As such, the LLR output for the received resource block i can be denoted as:

$$\sum_{k=1}^{K} v_{i,j,k} \quad \text{if} \quad \underset{k=1,\ldots,K}{\min}(m_{i,j,k} + \Delta_k) > \underset{k=1,\ldots,K}{\max}(m_{i,j,k} + \Delta_k) - \lambda,$$
$$v_{i,j,kk} \quad \text{else}$$

where $$kk = \underset{k=1,\ldots,K}{\operatorname{argmin}} m_{i,j,k}$$

and λ is a threshold parameter. The threshold parameter can be, for example, a tolerated noise level.

In this manner, multiple noise estimates can be accounted to determine a final LLR. The final LLR can be indicative of the most accurate demodulation signal from the multiple receive noise estimates. For instance, the LLR processor 304 can combine two or more the outputs from the MIMO detectors 1-K (e.g., LLRs and distance metrics) or determine that only one of the outputs is most accurate.

As depicted in FIGS. 2-3, the MIMO detectors and noise estimators are depicted as individual components. However, it should be noted that each component and/or block in FIGS. 2-3 can be implements as hardware and/or software individually or in combination with each other. For instance, the MIMO detector in FIG. 3 can be implemented by hardware that is implemented on the circuit. The MIMO detector k1 in FIG. 3 can be implemented by hardware on another or same circuit as the MIMO detector k2. If the components are implemented in different circuit, the circuit can be communicatively coupled to one another.

Example Methodology

Figure 4:
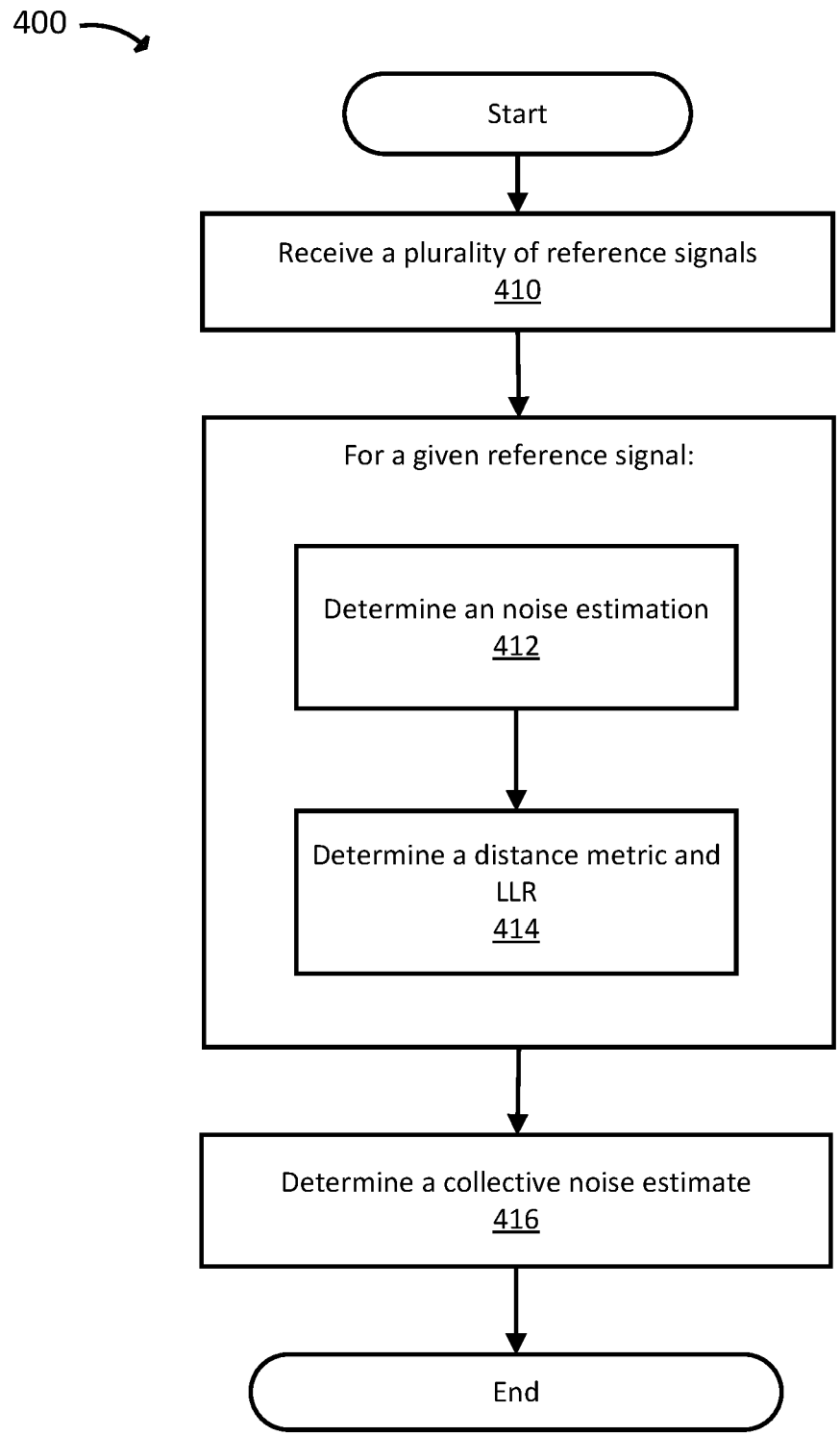
FIG. 4 illustrates a flowchart showing an example method for implementing the noise estimation system.

FIG. 4 illustrates a flowchart 400 showing an example method for implementing the noise estimation system. Flowchart 400 includes blocks 410, 412, 414, and 416. The techniques illustrated in flowchart 400 can be implemented by a device that include a memory and a processor that is capable of executing instructions stored in the memory. Further the device can include the components necessary, such as a receiver, to communicate with a transmitter. Further, the device can be capable of operating in MIMO technology and receiving signals from one or more transmitters. For instance, the device can connect to transmitters and communicate with the transmitters.

At block 410, the receiver (e.g., on the terminal device and/or the base station) can receive a plurality of reference signals. The reference signals can be from a transmitter that the receiver is connected to or from multiple interferers (e.g., transmitters) within a threshold distance of the receiver. The transmitter can be, as mentioned above, operating on MIMO technology. At block 412, for a given reference signal that is received, the receiver can determine a noise estimation. In some embodiments, the receiver can determine the noise estimate for every signal reference signal. As depicted in FIGS. 2-3, the reference signals can be processed by noise estimator 1-k. However, in some cases, the receiver can process the reference signal in a pattern, such as every other reference signal.

In some embodiments, determining a noise estimation can include determining a covariance of any of the interference from interferers, wherein the transmitter is connected to the receiver; interference from all interferers within a threshold distance; and/or interference from a particular interferer that the receiver is not connected to. In other words, the covariance can be based on interference from one or more interferers, including ones that the receiver is not connected to.

Thus, for example, the noise estimation can be as follows. For a first reference signal of a plurality of reference signals, the receiver can determine a first noise estimation according to a first covariance, wherein the first covariance is based on the interference from the interferer, wherein the interferer is connected to the receiver. Next, for a second reference signal of the plurality of reference signals, the receiver can determine a second noise estimate according a second covariance, wherein the second covariance is based on the interference from every interferer with the threshold distance. And third, for a third reference signal of the plurality of reference signals, the receiver can determine a third noise estimate according a third covariance, wherein the third covariance is based on the interference from the particular interferer that the receiver is not connected to.

At block 414, the receiver can determine a distance metric and LLR. Doing so can include decomposing the noise estimate based on Cholesky decomposition techniques, estimating the channel, and applying sphere decoding techniques. Estimating the channel can include factors such as scattering, fading, and power decay. Sphere decoding techniques can include technique such as k-best, fixed complexity sphere decoding, and/or depth first sphere decoding. Further the distance metric can be based on a Euclidean distance calculation and/or Manhattan distance calculation. In some embodiments, the receiver can apply different distance calculations methods to different noise estimates. For instance, a first distance metric of a first noise estimation can be based on the Euclidean Distance calculation and a second distance metric of a second noise estimation can be based on the Manhattan Distance calculation.

At block 416, the receiver can determine the final LLR based on the LLR and distance metric of each noise estimation. Doing so can include, for example, determining whether the distance metric is nearer to a threshold value than the distance metrics of other noise estimates. In some embodiments, determining the final LLR can include combining the LLRs of at least two noise estimations or selecting an LLR of a particular noise estimation based on the distance metric of the particular noise estimation. The former can include selecting the at least two noise estimations based on the distance metrics of the at least two noise estimations.

Computer System and Device Architecture

Figure 5:
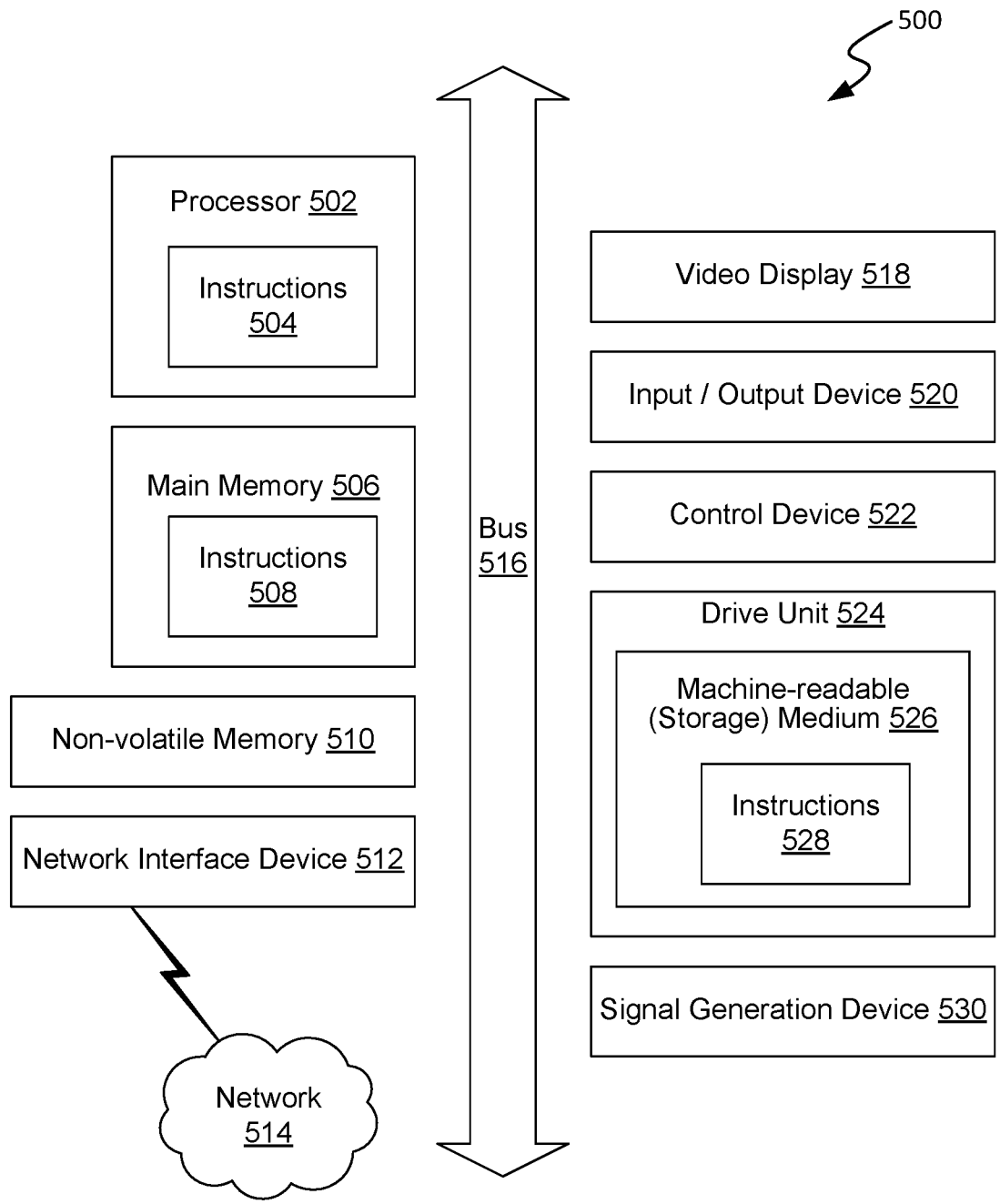
FIG. 5 illustrates a high-level block diagram showing an example of a wireless device in which at least some operations related to the techniques introduces here can be implemented.

FIG. 5 is a block diagram illustrating an example of a computing system 500 in which at least some operations described herein can be implemented. For example, some components of the computing system 500 utilized to implement a computing device (e.g., MIMO detector 1 and noise estimator 1 of FIG. 2).

The computing system 500 may include one or more central processing units (also referred to as "processors") 502, main memory 506, non-volatile memory 510, network adapter 512 (e.g., network interface), video display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents one or more physical buses and/or point-to-point connections that are connected by appropriate bridges, adapters, or controllers. The bus 516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 500 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 500.

While the main memory 506, non-volatile memory 510, and storage medium 526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 528. The term "machine-readable medium" and "storage medium" shall also be taken to include any medium that is capable of storing, encoding, or carrying a set of instructions for execution by the computing system 500.

In general, the routines executed to implement the embodiments of the disclosure may be implemented as part of an operating system or a specific application, component, program, object, module, or sequence of instructions (collectively referred to as "computer programs"). The computer programs typically comprise one or more instructions set at various times in various memory and storage devices in a computing device. When read and executed by the one or more processors 502, the instruction(s) cause the computing system 500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 510, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 512 enables the computing system 500 to mediate data in a network 514 with an entity that is external to the computing system 500 through any communication protocol supported by the computing system 500 and the external entity. The network adapter 512 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

In some embodiments, the present disclosure relates to a method for improving noise estimation at a receiver. The method includes the following steps. A plurality of reference signals are received. For a given reference signal, a noise estimation is determined, and a distance metric and a log-likelihood ratio (LLR) of the noise estimation are determined. A final LLR is determined based on the distance metric and the LLR of each noise estimation.

In some alternative embodiments, the present disclosure relates to a method. The method includes the following steps. A reference signal is received. A noise estimation of the reference signal is determined. A distance metric and a log-likelihood ratio (LLR) of the determined noise estimation is determined. Determining the distance metric and the LLR includes: decomposing the noise estimation based on Cholesky decomposition techniques; and applying sphere decoding techniques. A final LLR is determined based on the distance metric and the LLR of the noise estimation. Determining the final LLR further includes: combining the LLR of the noise estimation with an LLR of another noise estimation, or selecting the LLR of the noise estimation based on the distance metric of the noise estimation.

In yet other alternative embodiments, the present disclosure relates to a receiver. The receiver includes a receiver and a processor. The receiver is operable to receive a plurality of reference signals. The processor is operable to: for a given reference signal of the plurality of reference signals: determine a noise estimation, and determine a distance metric and a log-likelihood ratio (LLR) of the noise estimation; and determine a final LLR based on of the distance metric and the LLR of each noise estimation.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for improving noise estimation at a receiver, the method comprising:
   receiving a plurality of reference signals;
   for a given reference signal:
      determining a noise estimation; and
      determining a distance metric and a log-likelihood ratio (LLR) of the noise estimation; and
   determining a final LLR based on the distance metric and the LLR of each noise estimation;
   wherein determining the final LLR further comprises:
   combining the LLRs of at least two noise estimations; or
   selecting the LLR of a particular noise estimation based on the distance metric of the particular noise estimation;
   wherein for a first reference signal of the plurality of reference signal, the noise estimation is a first noise estimation, the distance metric is a first distance metric, and the LLR is a first LLR;
   for a second reference signal of the plurality of reference signals, the noise estimation is a second noise estimation, the distance metric is a second distance metric, and the LLR is a second LLR;
   wherein the method further comprises:
   determining a combined noise estimate, wherein determining the combined noise estimate comprises:
      combining the first LLR and the second LLR; or
      determining that the second distance metric is nearer to a threshold value than the first distance metric; and
      determining the combined noise estimate according to the second noise estimation.

2. The method of claim 1, wherein determining the final LLR further comprises:
   determining whether the distance metric is greater than a threshold value.

3. The method of claim 1, wherein determining the distance metric and the LLR comprises:
   decomposing the noise estimate based on Cholesky decomposition techniques; and
   applying sphere decoding techniques.

4. The method of claim 3, wherein the sphere decoding techniques include K-best, fixed complexity sphere decoding, and/or depth first sphere decoding.

5. The method of claim 1, wherein combining the LLRs of the at least two noise estimations further comprises:
   selecting the at least two noise estimations based on the distance metric of the at least two noise estimations.

6. The method of claim 1, wherein determining the noise estimation comprises:
   determining a covariance based on any of:
      interference from a transmitter, wherein the transmitter is connected to the receiver;
      interference from every transmitter within a threshold distance; and/or
      interference from a particular transmitter that the receiver is not connected to.

7. The method of claim 6, further comprising:
   for a first reference signal of the plurality of reference signals, determining a first noise estimation according to a first covariance, wherein the first covariance is based on the interference from the transmitter, wherein the transmitter is connected to the receiver.

8. The method of claim 6, further comprising:
   for a second reference signal of the plurality of reference signals, determining a second noise estimate according a second covariance, wherein the second covariance is based on the interference from every transmitter with the threshold distance.

9. The method of claim 6, further comprising:
   for a third reference signal of the plurality of reference signals, determining a third noise estimate according a third covariance, wherein the third covariance is based on the interference from the particular transmitter that the receiver is not connected to.

10. The method of claim 1, wherein the distance metric is based on a Euclidean Distance calculation and/or Manhattan Distance calculation.

11. The method of claim 10, wherein a first distance metric of a first noise estimation is based on the Euclidean Distance calculation, wherein a second distance metric of a second noise estimation is based on the Manhattan Distance calculation.

12. The method of claim 1, wherein the plurality of reference signals is from a transmitter that the receiver is connected to or from multiple transmitters within a threshold distance of the receiver.

13. The method of claim 1, wherein the receiver is operating in multiple-input and multiple output (MIMO) technology.

14. A method comprising:
   receiving a reference signal;
   determining a noise estimation of the reference signal;
   determining a distance metric and a log-likelihood ratio (LLR) of the determined noise estimation, wherein determining the distance metric and the LLR comprises:
      decomposing the noise estimation based on Cholesky decomposition techniques; and
      applying sphere decoding techniques; and
   determining a final LLR based on the distance metric and the LLR of the noise estimation,
      wherein determining the final LLR further comprises:
      combining the LLR of the noise estimation with an LLR of another noise estimation; or
      selecting the LLR of the noise estimation based on the distance metric of the noise estimation;
   wherein the reference signal is a first reference signal, the noise estimation is a first noise estimation, the distance metric is a first distance metric, and the LLR is a first LLR, the method further comprising:
   receiving a second reference signal;
   determining a second noise estimation of the second reference signal;
   determining a second distance metric and a second (LLR) of the second noise estimation; and
   determining a combined noise estimate, wherein determining the combined noise estimate comprises:
      combining the first LLR and the second LLR; or
      determining that the second distance metric is nearer to a threshold value than the first distance metric; and
      determining the combined noise estimate according to the second noise estimation.

15. The method of claim 14, wherein the method is performed by a receiver, and wherein the reference signal is from a transmitter that the receiver is connected to.

16. A receiver comprising:
   a receiver operable to receive a plurality of reference signals; and
   a processor operable to:
      for a given reference signal of the plurality of reference signals:
         determining a noise estimation; and
         determine a distance metric and a log-likelihood ratio (LLR) of the noise estimation; and
      determine a final LLR based on of the distance metric and the LLR of each noise estimation;
   wherein the processor is further operable to:
   combine the LLRs of at least two noise estimations; or
   select the LLR of a particular noise estimation based on the distance metric of the particular noise estimation;
   wherein for a first reference signal of the plurality of reference signal, the noise estimation is a first noise estimation, the distance metric is a first distance metric, and the LLR is a first LLR;
   for a second reference signal of the plurality of reference signals, the noise estimation is a second noise estimation, the distance metric is a second distance metric, and the LLR is a second LLR;
   wherein the processor is further operable to:
   determine a combined noise estimate, wherein determining of the combined noise estimate comprises:
      combining the first LLR and the second LLR; or
      determining that the second distance metric is nearer to a threshold value than the first distance metric; and determining the combined noise estimate according to the second noise estimation.

17. The receiver of claim 16, wherein the receiver is operating in multiple-input and multiple output (MIMO) technology, and the plurality of reference signals are from one or more transmitters.

18. The receiver of claim 17, wherein the receiver is connected to the one or more transmitters.

* * * * *